INVENTORS,
HARRY G. OSWIN
KEITH F. BLURTON 3,556,849
RECHARGING ALKALINE/ZINC CELLS
Harry G. Oswin, Chauncey, and Keith F. Blurton, Hempstead, N.Y., assignors to Leesona Corporation, Warwick, R.I., a corporation of Massachusetts
Filed June 19, 1968, Ser. No. 738,227
Int. Cl. H01m 43/02
U.S. Cl. 136—30    10 Claims

ABSTRACT OF THE DISCLOSURE

An improved method of recharging a secondary battery utilizing a zinc anode is described comprising maintaining the current density during charging between about 1 and 15 ma./cm.$^2$ and pulse charging, i.e., charging with a periodic cut-off of current, with the on time being no greater than about 150 milliseconds and the off period being at least 0.5 of the on period.

FIELD OF INVENTION AND PRIOR ART

Figure 1:
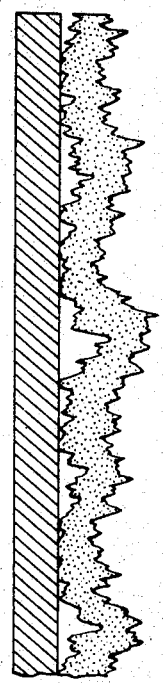

This invention is directed to secondary batteries. More particularly, this invention is directed to an improved method of recharging secondary batteries utilizing a zinc anode.

Galvanic cells comprising a zinc anode in conjunction with an alkaline hydroxide electrolyte and known metal cathodes, such as a porous silver cathode, are highly desirable in view of the high current output theoretically obtainable. More recently, zinc/air cells have received wide recognition in view of their high energy: density ratio, high current capacity and their rapid discharge rate. However, the rechargeability of the aforesaid cells is limited in that the product of zinc discharge, namely zinc oxide, is readily soluble in the alkaline electrolyte as the zincate ion. During the charge portion of the cycle, the zinc of the zincate ion is normally plated out to a greater or lesser extent in the form of dendrites. More specifically, during discharge of the zinc electrode three reactions can occur:

(1) $Zn + 2OH^- \rightarrow ZnO_{(solid)} + H_2O + 2e$;
(2) $Zn + 2OH^- \rightarrow ZN(OH)_{2(solid)} + 2e$;— and
(3) $Zn + 4OH^- \rightarrow Zn(OH)^=_{4(solution)} + 2e$.

Dendrites occur during the charge portion of the cycle as a result of the reverse of reaction (3), i.e.

(4) $Zn(OH)^=_{4(solution)} + 2e \rightarrow Zn + 4OH^-$

Two main types of dendrites, mossy and crystalline, can form depending upon whether the process is activation or diffusion-controlled, respectively. The crystalline variety is often responsible for early failure of the galvanic cell due to shorting, loss of capacity due to break away of active material from the negative plate causing variability of performance and limited cycle life. The mossy variety is undesirable, primarily in that the moss does not adhere to the primary electrode, flaking off and again causing variability of performance and limited cycle life.

Although the problem of dendrite growth has been actively investigated in the battery art for a number of years and a number of solutions suggested, including various modifications in the charging technique and/or the incorporation of additives to the zinc anode and electrolyte of the cell, no completely acceptable solution has been advanced to date.

OBJECTS AND GENERAL DESCRIPTION OF THE INVENTION

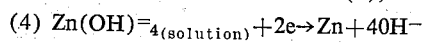

Accordingly, it is an object of the present invention to provide an improved method of recharging conventional electrochemical cells utilizing a zinc anode, an alkaline electrolyte and a cathode which substantially eliminates dendrite formation.

It is another object of this invention to provide an improved method of recharging an electrochemical cell utilizing a zinc anode without formation of dendrites whereby the cell is effectively fully recharged utilizing a minimum of energy and permits the recharging in a relatively short period of time.

These and other objects of the invention will be more readily apparent from the following detailed description, with particular emphasis being placed upon the examples and drawings.

In accordance with the present invention, the dendrite formation in a rechargeable or secondary electrochemical cell comprising a zinc anode, an alkaline electrolyte and a cathode can be eliminated or substantially minimized by controlling the charging current density and the application of the controlled current density to the electrochemical cell. More specifically, it has been discovered that dendrite growth can be eliminated, or substantially minimized, by maintaining a charging current density within the range of about 1 and 15 ma./cm.$^2$ and pulse charging, i.e., charging with a periodic cutoff of current. The on and off time of the pulse charging is critical to the extent that the on time can be no greater than about 150 milliseconds, and preferably is as short as practical. Moreover, the off period, again within practical limits, is to be as long as possible and in no event less than 0.5 of the on period.

Since the current density is below the critical current density which is dependent upon temperature and the geometric surface area of the electrode and is defined as the transition region at a select temperature below which mossy, non-adherent zinc dendritic deposits occur and above which crystalline dendritic growth occurs, no problem is encountered as a result of crystalline dendritic growths. However, the mossy type dendrites which are a result of surface effects of the electrode or are activation controlled do occur. With the mossy growths mass transfer does not apply in view of the low current density at which the charging occurs. Accordingly, it would not be expected that pulse changing would be effective, or at least not to the extent that short on and controlled off periods in the millisecond range would be beneficial. Surprisingly, however, it has been observed that by using pulse charging and carefully controlling the application of the charging current density a smooth, adherent zinc deposit is obtained. The on period, to obtain beneficial results, must not be longer than about 150 milliseconds, with the on time preferentially being less than 75 milliseconds with the optimum beneficial results occurring at 40 milliseconds or less. The off period is preferentially twice as long or longer than the on period and in no event less than 0.5 of the on time. A practical trade-off is the utilization of equal on and off times.

The beneficial results of the described recharging are obtained with any alkaline electrolyte, whether free-flowing or trapped in a matrix. However, circulation of the electrolyte can be advantageous in that normally the zincate ions being heavier than the alkaline hydroxide electrolyte have a tendency to settle to the bottom of the cell causing proportionately faster mass propagation at the bottom of the anode and faster dendrite propagation at the top of the anode. By employing the pulse charging technique, however, the need for a circulating electrolyte is minimized or substantially eliminated.

DRAWINGS AND EXAMPLES

Figure 2:
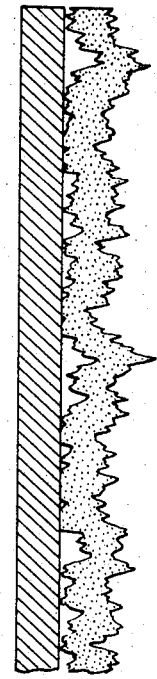
Figure 3:
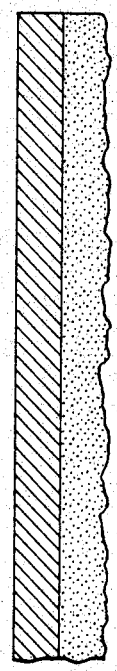

Having described the invention in general terms, the following examples, with particular reference to the drawing, will be set forth to more fully illustrate the invention. In the drawings, FIG. 1 is an enlarged cross-section of an electrode showing the nature of the zinc growth utilizing a continuous direct current density of 4 milliamps per cm.$^2$ of geometric electrode surface area. FIG. 2 is an enlarged cross-section of an electrode showing the nature of the zinc growth when employing a current density of 4 milliamps per cm.$^2$ and pulse charging with the "on" time being 30 seconds and an off time of 20 seconds, and FIG. 3 is an enlarged cross-section of an electrode illustrating the smooth and even distribution of the zinc deposit when employing a current density of 4 ma./cm.$^2$ and an on time of 10 milliseconds, and an off time of 50 milliseconds.

Example I

A conventional silver/zinc cell is constructed using a 43% aqueous potassium hydroxide electrolyte solution. The negative electrode employed comprises sheet zinc having a surface area of 22 cm.$^2$. After discharging, a constant or continuous charging direct current of 4 milliamps per cm.$^2$ was applied with the charging being continued until 18 coulombs per cm.$^2$ had been applied. The zinc electrode was removed from the cell and photomicrographs taken. A non-adherent, mossy type dendritic growth was observed as shown in FIG. 1.

Example II

A cell is constructed substantially identical to the cell described in Example I. However, in this instance, after discharging a charging current density of 4 milliamps per cm.$^2$ is applied by means of a pulsing current, 30 seconds on and 20 seconds off, until a total of 18 coulombs per cm.$^2$ of electrode area was applied. The zinc electrode was removed from the cell and examined by means of photomicrographs to show a mossy, non-adherence dendritic growth of the type shown in FIG. 2. Approximately 3.1 coulombs per cm.$^2$ was applied before the mossy growth started to appear. The adherent zinc amounted to 4 coulombs per cm.$^2$ and the non-adherent deposit 14.0 coulombs per cm.$^2$.

Example III

Another cell was constructed substantially as described in Example I. In this instance, after discharging a charging current density of 4 milliamps per cm.$^2$ was applied by the pulsing technique, with the on time being 10 milliseconds and the off time being 50 milliseconds. A total of 60 coulombs per cm.$^2$ was applied with the current efficiency for deposition being 85%. A smooth, adherent zinc deposit as shown in FIG. 3 was obtained.

Example IV

A conventional silver/zinc cell is constructed utilizing a 43% aqueous sodium hydroxide electrolyte solution. The negative electrode employed comprises a porous zinc structure having a porosity of 75%, and the positive electrode comprises a porous silver structure having a porosity of 60%. The zinc electrode is prepared by slurrying zinc metal particles with water, compacting at a pressure of 100 p.s.i. to remove most of the water, drying at 100° C. for a period of 60 minutes, and thereafter bonding the zinc particles at a temperature of 280° C. for 40 minutes. The silver electrode is formed in like manner. However the final sintering is performed at a temperature of 530° C. for 55 minutes. After sintering, the electrode is oxidized anodically of 30% aqueous KOH to form the silver oxide. The negative and positive electrodes are electrically separated by a fibrous cellulose membrane which contains the potassium hydroxide electrolyte. The cell was continuously discharged and charged for a total of 20 cycles, with the charging being carried out at a current density of 8 milliamps per cm.$^2$ geometric surface area of the zinc and the charge applied by a pulsing technique 40 milliseconds on and 40 milliseconds off. At the end of the 20 cycles the cell performed without indication of substantial degradation.

Example V

An air battery was constructed comprising a porous zinc anode having a conductive screen extending the length of the anode and wrapped with fiber-reinforced cellulose and a composite cathode comprising a polytetrafluoroethylene membrane in intimate contact with a conductive nickel screen and a layer of uniformly mixed polytetrafluoroethylene particles and platinum black. The loading of platinum in the catalyst layer was approximately 7 mgs. platinum per cm.$^2$ of the cathode surface. The catalytic layer of the cathode was in intimate contact with the reinforced cellulose wrapped around the anode. The cellulose wrap was impregnated with 28% aqueous potassium hydroxide electrolyte solution. The unit was sealed from the top to provide a fluid-tight cell. The cell was subjected to continuous charge and discharge cycles for a total of 20 cycles, with the charging being carried out at a current density of 12 milliamps per cm.$^2$ geometric surface area of the zinc, and the current applied by the pulsing technique 10 milliseconds on and 20 milliseconds off. At the end of the 20 cycles no noticeable deterioration in performance was observed.

In the aforesaid examples the current density can be varied from about 1 to 15 milliamps per cm.$^2$. Additionally, the pulsing periods can be modified within the upper limit of 150 milliseconds of on time. The electrolyte utilized in the cell can be any alkaline hydroxide electrolyte, including sodium hydroxide, cesium hydroxide, rubidium hydroxide, lithium hydroxide, mixtures thereof, as well as the alkaline earth hydroxides, such as calcium hydroxide, strontium hydroxide, barium hydroxide and the like. Furthermore, although from the practical considerations ambient conditions are preferred for the recharging operation, charging at higher temperatures is permissible and increases the ionic mass transfer.

It should be appreciated that the instant invention is not to be construed as being limited by the illustrative examples. It is possible to produce still other embodiments without departing from the inventive concept herein disclosed. Such embodiments are within the ability of one skilled in the art.

We claim:

1. An improved method for generating electricity utilizing a secondary battery having a plurality of electrochemical cells, each cell comprising a cathode member, a zinc anode, and an alkaline electrolyte therebetween; said method including the steps:
  (a) pulse charging said cells by applying a controlled current density of from about 1 to 15 milliamps per cm.$^2$ of geometric zinc surface area, the on period of the pulse charging being no greater than about 150 milliseconds and the off period being no less than 0.5 of the on period; and thereafter
  (b) discharging the plurality of electrochemical cells by applying an external load to said battery.

2. The method of claim 1 wherein the battery is a zinc/air battery including a cathode member comprising an air permeable, liquid impermeable supporting membrane coated with electrocatalyst, and the electrolyte comprises an alkaline metal hydroxide.

3. The method of claim 1 wherein the battery is a silver/zinc battery.

4. The method of claim 1 wherein the off period of the pulse charging ranges from one-half to about twice the on period.

5. The method of claim 1 wherein the on period of the pulse charging is no greater than 75 milliseconds and the off period is at least equal to the on period.

6. The method of claim 1 wherein the on period of the pulse charging is no greater than 40 milliseconds and the off period is at least equal to the on period.

7. The method of claim 1 wherein the current density is from about 4 to 12 milliamps per cm.$^2$ of geometric zinc surface area.

8. The method of claim 1 wherein the electrolyte is potassium hydroxide.

9. The method of claim 1 wherein the electrolyte is in free-flowing form.

10. The method of claim 1 wherein the electrolyte is trapped in a hydrophilic matrix.

References Cited

UNITED STATES PATENTS

| 2,443,599 | 6/1948 | Chester | 204—228 |
|---|---|---|---|
| 3,258,671 | 6/1966 | Wales | 136—30 |
| 3,455,741 | 7/1969 | Schneider | 136—75 |

FOREIGN PATENTS

| 173,279 | 7/1965 | Russia | 136—30 |

WINSTON A. DOUGLAS, Primary Examiner

C. F. LeFEVOUR, Assistant Examiner

U.S. Cl. X.R.

136—76; 320—21